(12) United States Patent
Agee et al.

(10) Patent No.: US 6,478,526 B2
(45) Date of Patent: Nov. 12, 2002

(54) HAY BALE LIFTER DEVICE

(76) Inventors: Jace Agee, HCR 61 Box 52, Alamo, NV (US) 89001; Ruth Agee, HCR 61 Box 52, Alamo, NV (US) 89001

( * ) Notice: Subject to any disclaimer, the term of this patent is extended or adjusted under 35 U.S.C. 154(b) by 0 days.

(21) Appl. No.: 09/814,209

(22) Filed: Mar. 21, 2001

(65) Prior Publication Data

US 2001/0045716 A1 Nov. 29, 2001

Related U.S. Application Data (60) Provisional application No. 60/191,628, filed on Mar. 23, 2000.

(51) Int. Cl.[7] .............................................. B62B 1/22
(52) U.S. Cl. ...................... 414/450; 280/47.3; 414/24.5
(58) Field of Search ............................. 280/47.3, 47.32; 414/24.5, 24.6, 450, 490

(56) References Cited

U.S. PATENT DOCUMENTS

| | | | | |
|---|---|---|---|---|
| 177,949 A | * | 5/1876 | McKinney | 414/450 |
| 228,967 A | * | 6/1880 | Woods | 414/450 |
| 705,406 A | * | 7/1902 | House et al. | 414/450 |
| 842,754 A | * | 1/1907 | Bierie | 414/450 |
| 1,449,011 A | * | 3/1923 | Littlefield | 414/450 |
| 3,935,954 A | | 2/1976 | Woods et al. | |
| 3,938,682 A | | 2/1976 | Rowe | |
| 3,964,621 A | | 6/1976 | Youngkamp | |
| 4,174,849 A | * | 11/1979 | Wetzel | 280/47.3 |
| 4,367,062 A | | 1/1983 | Duenow | 414/24.5 |
| D285,019 S | | 8/1986 | Jackmore | D34/26 |
| 4,731,188 A | | 3/1988 | Johnson et al. | 210/783 |
| 5,222,757 A | | 6/1993 | Magyar | 280/653 |
| 5,246,239 A | | 9/1993 | Braden | 280/47.24 |
| 5,277,439 A | | 1/1994 | Pipes et al. | 280/47.2 |
| 5,833,424 A | | 11/1998 | Bales | 414/24.5 |
| 6,109,856 A | * | 8/2000 | Mings | 414/490 |

FOREIGN PATENT DOCUMENTS

| | | | | |
|---|---|---|---|---|
| GB | 868392 | * | 5/1961 | 414/450 |
| IT | 646725 | * | 10/1962 | 414/450 |

* cited by examiner

*Primary Examiner*—Janice L. Krizek
(74) *Attorney, Agent, or Firm*—Morris, Bateman, O'Bryant & Compagni (57) ABSTRACT

A hand-operated device is provided for lifting and transporting heavy bales of plant material, such as bales of hay or other objects, which is structured to enable persons of even modest strength to transport such bales of material. The hand-operated device provides bale-engaging members associated with lateral arms and a wheel assembly so that the device engages and lifts the bale of plant material, thereby avoiding the need to physically lift the heavy bale of material for transportation.

17 Claims, 6 Drawing Sheets

HAY BALE LIFTER DEVICE

CROSS REFERENCE TO RELATED APPLICATIONS

This application claims priority to provisional patent application Ser. No. 60/191,628 filed Mar. 23, 2000.

BACKGROUND

1. Field of the Invention

This invention relates to farming implements, and more specifically relates to a hand-operated device for easily lifting and moving a hay bale or other similar object without physical strain or exertion.

2. Description of Related Art

Various types of grains, grasses and other plant materials grown under agricultural conditions are cut and baled out in the field. For many centuries, farm hands would physically lift the bales of plant material in the fields and place them in a cart, wagon or truck for transport off the field. Once the bales were delivered off the field, farm hands would remove the bales from the transport means and physically move the bales to other areas for storage, or for transport to market. In the last century, large farming equipment has been developed to pick up bales of hay and the like from the field for transport to a storage area or for sale on the market. Despite the development of large bale-moving equipment, there are still many occasions when it is impractical or impossible to move bales of plant material using large equipment, either because the few number of bales that need to be moved does not warrant using large equipment or the place where the bales are located will not accommodate a large truck or other devices. In such instances, the bales must be moved by hand. Moving bales of material by hand is not only physically exhausting, but can only be done by persons possessing relatively greater strength.

Recognizing that there are occasions when bales of plant material must be moved by hand, various implements have been used to carry out the task. Principally, conventional hand carts or wheelbarrows have been used to move bales of plant material. Others devices have been specifically developed for use in carrying a bale of plant material, but such devices usually comprise the same elements as hand carts or wheelbarrows. These hand-operated devices have in common the fact that they require the user to lift the heavy bale of plant material onto the device for transport. As a result, the task of moving heavy bales of plant material is still a strenuous job which can only be undertaken by persons of relatively greater strength. Known hand-operated bale transport devices cannot, therefore, be used by smaller children or adults with reduced strength capabilities.

Thus, it would be advantageous to provide a hand-operated device for enabling an individual of even modest strength to easily engage and lift a heavy bale of plant material to transport it a distance without requiring physical lifting of the bale and without requiring or causing undue strain.

BRIEF SUMMARY OF THE INVENTION

In accordance with the present invention, a device for lifting and transporting is provided which is structured to be easily hand-operated and maneuverable to engage and transport bales of plant material, or similar objects, without having to physically lift the object to engage it with the transportation device. The configuration and construction of the present invention is such that persons of even modest strength can engage heavy bale-like objects and transport them a considerable distance. The device of the present invention is useful in engaging and transporting any number of objects, but is described herein with respect to engaging and transporting bales of hay by way of example only.

The device of the present invention generally comprises a pair of lateral arms pivotally connected to and oriented rearward of a wheel assembly. Both the lateral arms and wheel assembly have associated therewith bale-engaging members which are brought into engagement with a bale of hay by movement of the lateral arms and wheel assembly. Once the device has been maneuvered into place relative to the bale of hay, and the bale-engaging members have been brought into engagement with the bale of hay, the lateral arms are lifted upward, thereby lifting the bale of hay from the ground so that it can be moved. Transport of the bale is accomplished by exerting forward motion on the device to advance the wheel in a forward direction. Once the bale of hay has been delivered to its intended destination, the lateral arms are pivoted away from each other to disengage the bale-engaging members from the bale and the wheel assembly is urged forward and away from the bale of hay to disengage the bale-engaging member of the wheel assembly from the bale of hay. The device of the present invention may preferably include linkage mechanisms interconnecting the lateral arms to the wheel assembly to facilitate connection of the bale-engaging members to the bale of hay.

BRIEF DESCRIPTION OF THE SEVERAL VIEWS OF THE INVENTION

In the drawings, which illustrate what is currently considered to be the best mode for carrying out the invention.

DETAILED DESCRIPTION OF THE INVENTION

Figure 1:
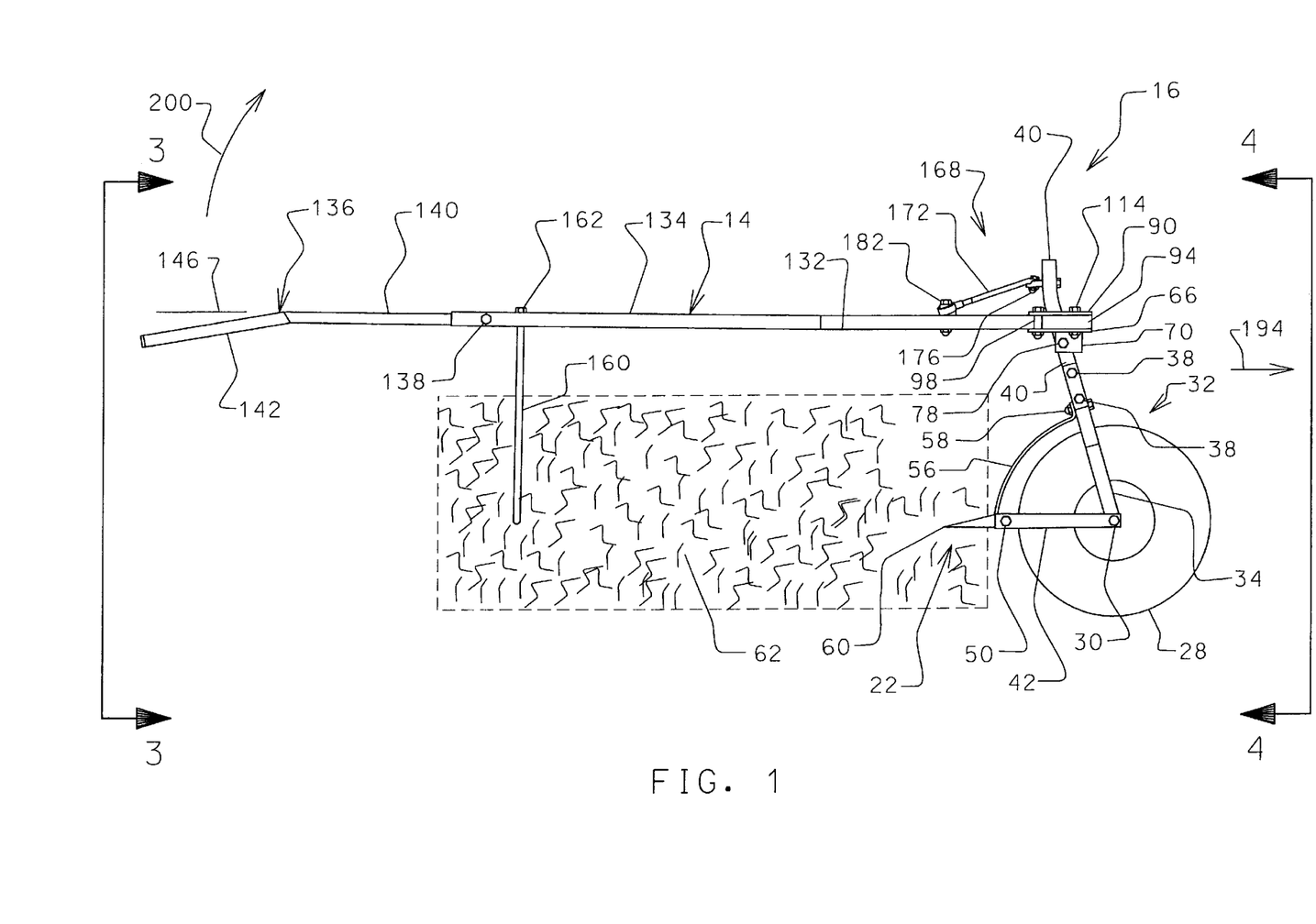
FIG. 1 is a view in elevation of the device of the present invention, illustrating a bale of hay (in phantom) engaged by the device.
Figure 2:
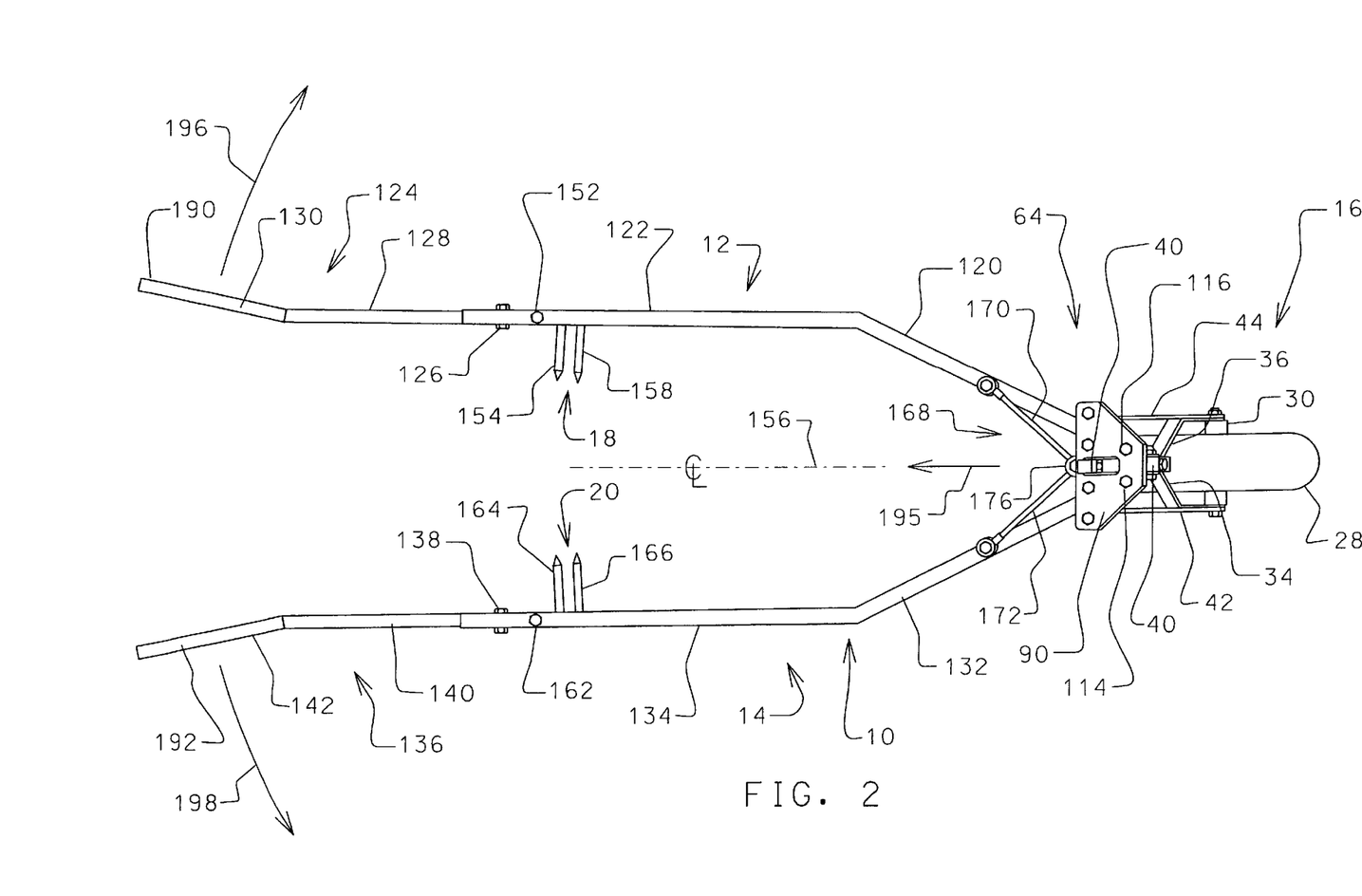
FIG. 2 is a plan view of the device shown in FIG. 1.

FIGS. 1 and 2 provide an illustration of the lifting device 10 of the present invention, which is generally comprised of two lateral arms 12, 14 and a wheel assembly 16 to which the two lateral arms 12, 14 are pivotally connected. The lateral arms 12, 14 each have associated therewith bale-engaging members 18, 20, and the wheel assembly 16 has associated therewith a bale-engaging member 22, as described more fully below.

Figure 3:
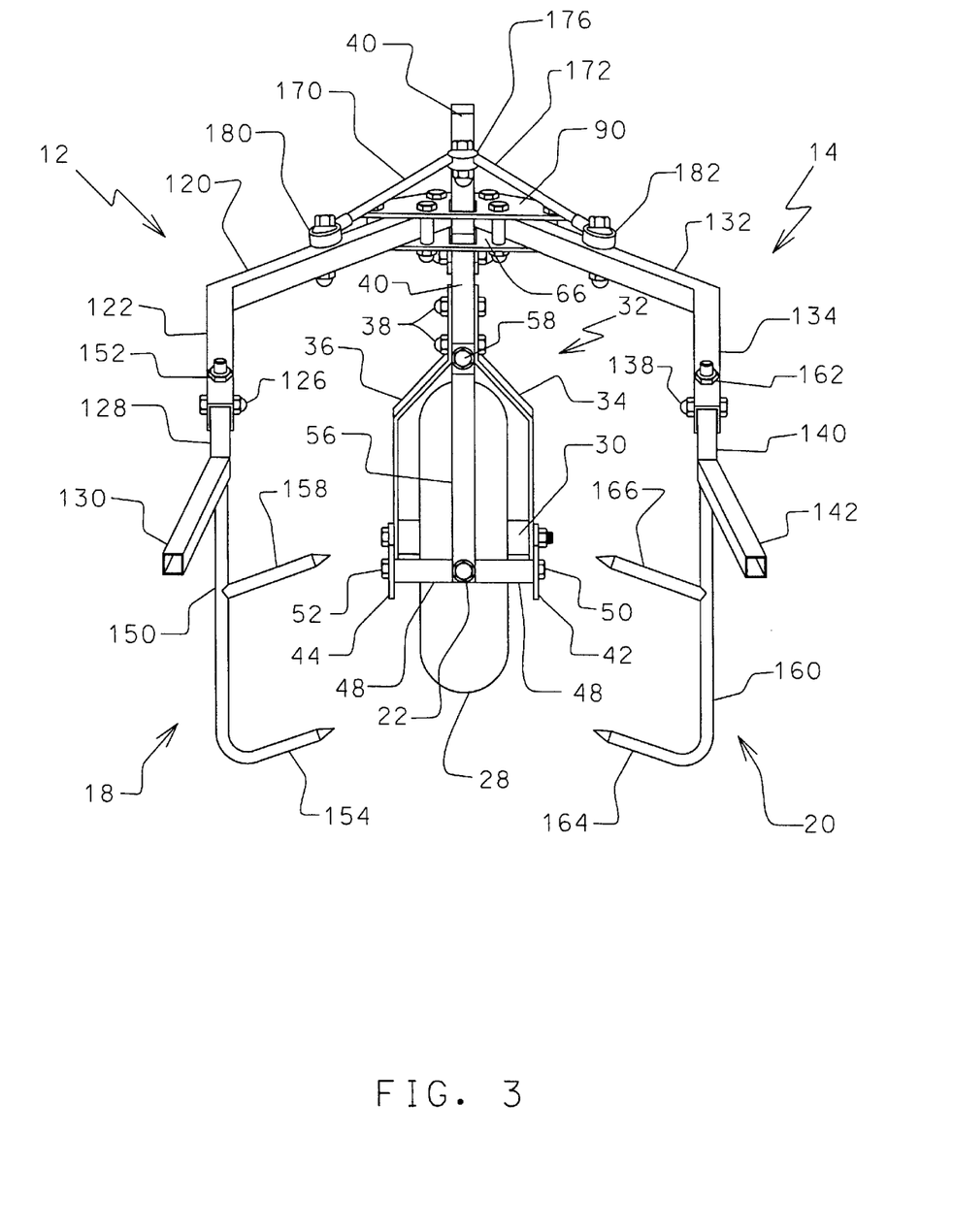
FIG. 3 is a view in elevation of the device as viewed from line 3—3 of FIG. 1.
Figure 4:
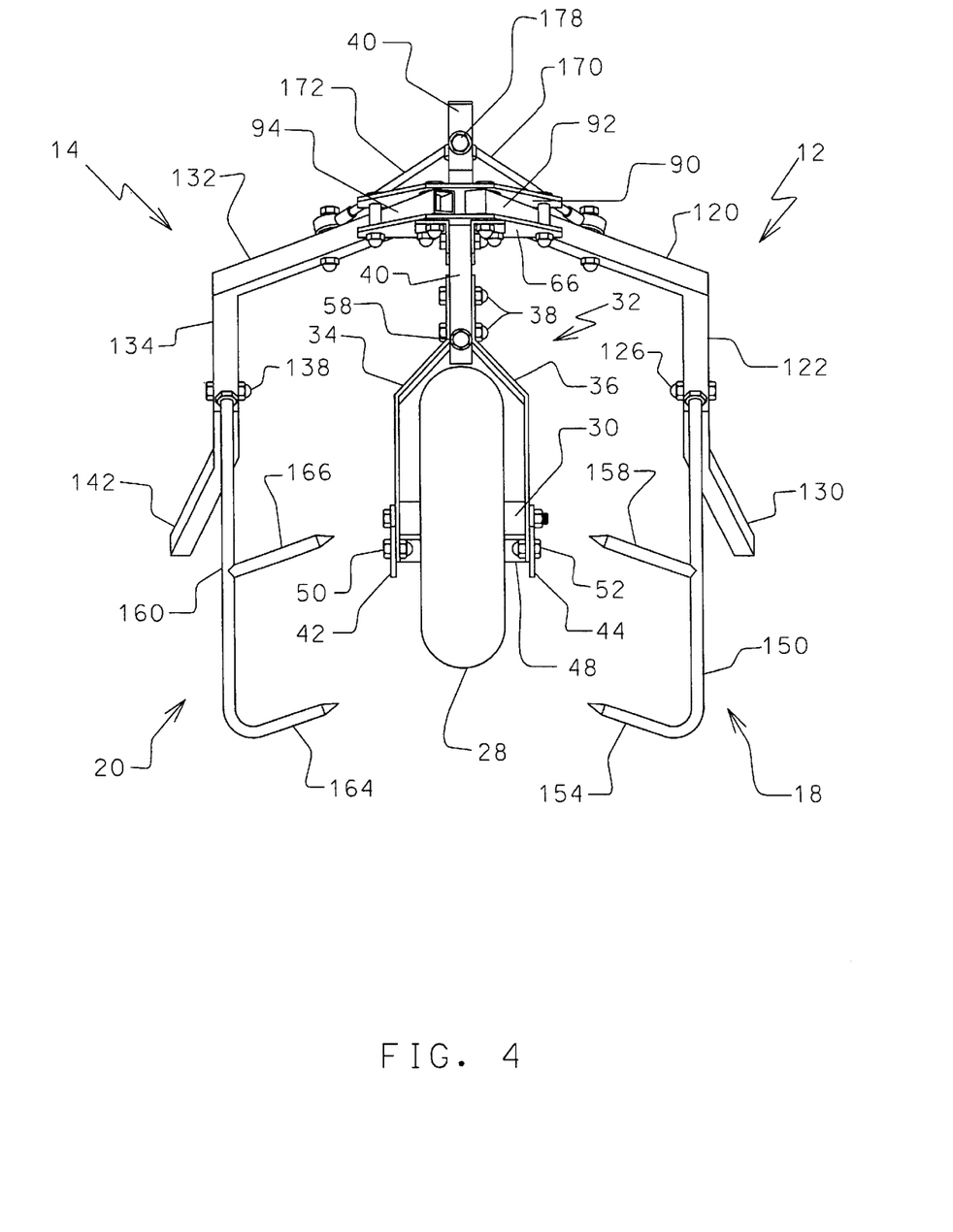
FIG. 4 is a view in elevation of the device as viewed from line 4—4 of FIG. 1.

The wheel assembly 16 of the present invention includes a wheel 28, having an axle 30, which is oriented forward of the lateral arms 12, 14. A wheel fork assembly 32 connects the wheel 28 to a vertical support 40 of the wheel assembly 16. The wheel fork assembly 32, as shown more fully in FIGS. 3 and 4, comprises a right fork arm 34 which connects at one end thereof to the axle 30 of the wheel 28 and is secured at its other end to the vertical support 40 by bolts 38, or the like. The wheel fork assembly 32 also comprises a left fork arm 36 which connects at one end thereof to the axle 30 of the wheel 28 and is secured at its other end to the vertical support 40 by bolts 38, or the like.

As shown more clearly in FIGS. 1 and 2, a right lateral wheel guard 42 is positioned along one side of the wheel 28 and is attached at one end to the axle 30 of the wheel 28 from which it extends rearward. A left lateral wheel guard 44 is positioned along the other side of the wheel 28 and is attached to the axle 30 from which it extends rearward. The right lateral wheel guard 42 and left lateral wheel guard 44 are oriented parallel to each other and are connected at their terminal ends to a cross bar support 48, best shown in FIG. 3. The right lateral wheel guard 42 and left lateral wheel guard 44 may preferably be secured to the cross bar support 48 by bolts 50, 52 or other suitable means.

A curved spike support 56 extends from the vertical support 40, to which it is secured by such means as a bolt 58, to the cross bar support 48, to which it is also secured by such means as a bolt (not shown). A bolt or other securement means (not shown) secures the bale-engaging member 22 of the wheel assembly 16 to the curved spike support 56 so that the bale-engaging member 22, shown here as a spike 60, extends rearward from the wheel 28. As shown in FIG. 1, the spike 60 is thus positioned to pierce a bale of hay 62. Although the drawings herein illustrate a single spike 60, a plurality of spiked or pointed objects may be employed to engage the bale of hay. It is only important that the bale-engaging member 22 be made of suitably strong material (e.g., steel) and/or be suitably configured to assure that it will not bend, warp or break when engaging a heavy bale of hay.

Figure 5:
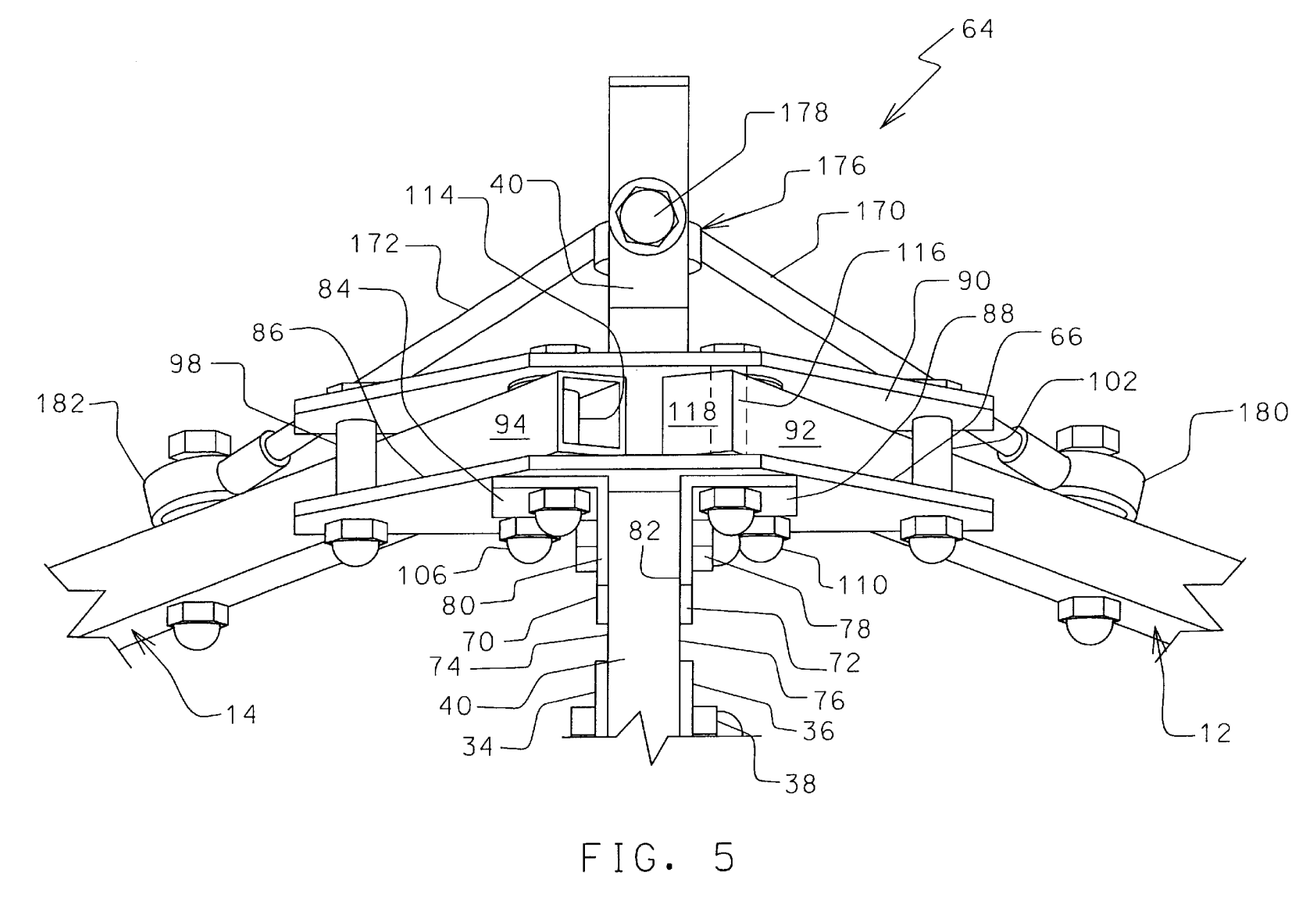
FIG. 5 is an enlarged view in perspective of the articulating lateral arm assembly.
Figure 6:
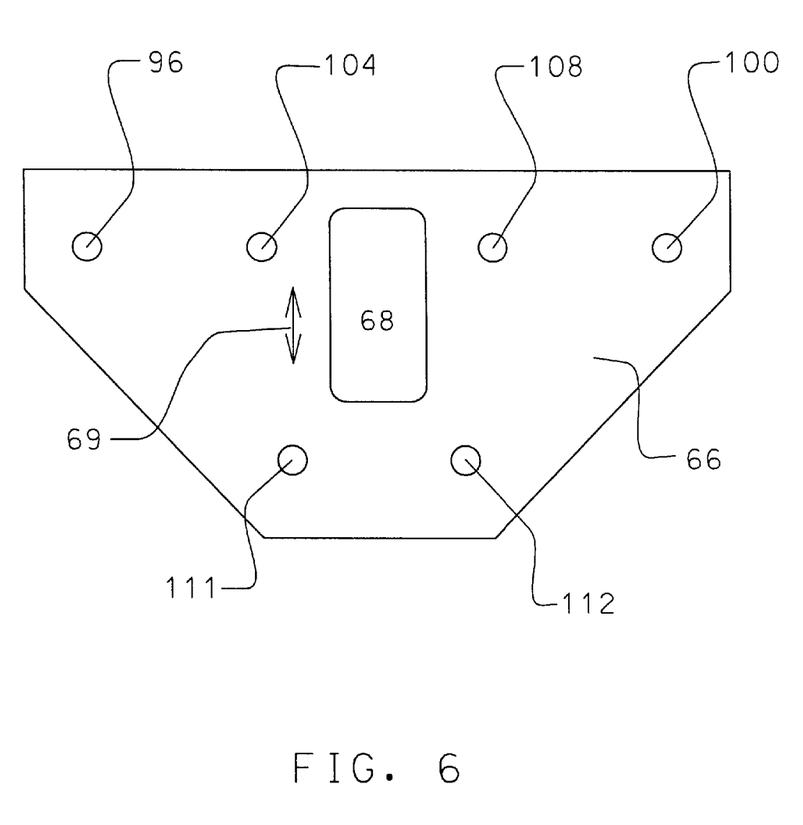
FIG. 6 is a plan view of the plate of the articulating lateral arm assembly.

The wheel assembly 16 is further constructed with a lateral arm assembly 64 to interconnect the lateral arms 12, 14 of the device 10 to the vertical support 40 of the wheel assembly 16 in a pivoting manner. As shown most clearly in FIG. 5, the lateral arm assembly 64 comprises a first support plate 66 which is secured to the vertical support 40 to provide for attachment of the lateral arms 12, 14 thereto. As shown in FIG. 6, the first support plate 66 is generally configured with a truncated triangular shape, although any other shape, configuration or dimension may be equally as suitable. The first support plate 66 is structured with an elongated aperture 68 sized to receive the vertical support 40 therethrough. The elongated aperture 68 also allows the vertical support 40 to move in the direction of arrow 69 within the elongated aperture 68, as described more fully hereinafter.

Referring again to FIG. 5, the first support plate 66 is held in position on the vertical support 40 by the placement of a first angle bracket 70 and a second angle bracket 72 on opposing sides 74, 76 of the vertical support 40. A bolt 78 extends through one side 80 of the first angle bracket 70, through the vertical support 40 and through one side of the 82 of the second angle bracket 72 to secure the first angle bracket 70 and second angle bracket 72 to the vertical support 40. The perpendicularly extending side 84 of the first angle bracket 70 is secured to the underside 86 of the first support plate 66, as is the perpendicularly extending side 88 of the second angle bracket 72.

A second support plate 90, which is configured in the same manner as the first support plate 66 shown in FIG. 6, is positioned about the vertical support 40 by positioning the vertical support 40 through a central aperture 68 formed in the second support plate 90. The end 92 of the left lateral arm 12 and the end 94 of the right lateral arm 14 are positioned between the first support plate 66 and second support plate 90. As illustrated by FIG. 6, the support plates are further structured with a number of holes through which bolts or screws are positioned to secure the first support plate 66 to the second support plate 90. The holes formed in the respective support plates are aligned when the second support plate 90 is properly positioned above the first support plate 66 and spaced therefrom, as shown in FIG. 5. Thus, outer right holes 96 formed in the respective first support plate 66 and second support plate 90 are aligned to receive a first outer bolt 98 therethrough, while outer left holes 100 formed in the respective first support plate 66 and second support plate 90 are aligned to receive a second outer bolt 102 therethrough. Inner right holes 104 formed in the respective first support plate 66 and second support plate 90 are aligned to receive a first inner bolt 106 therethrough, while inner left holes 108 formed in the respective first support plate 66 and second support plate 90 are aligned to receive a second inner bolt 110 therethrough. The end 94 of the right lateral arm 14 extends between the first support plate 66 and second support plate 90 and between the first outer bolt 98 and first inner bolt 106. The end 92 of the left lateral arm 12 likewise extends between the first support plate 66 and the second support plate 90 and between the second outer bolt 102 and the second inner bolt 110.

The support plates 66, 90 are each formed with a right forward hole 111 (FIG. 6) for receiving a right pivot bolt 114 (FIG. 5), and each support plate 66, 90 is also formed with a left forward hole 112 to receive a left pivot bolt 116. Accordingly, the end 94 of the right lateral arm 14 is pivotally secured between the first support plate 66 and second support plate 90 by right pivot bolt 114, which also extends between the perpendicular side 84 of the first angle bracket 70, the first support plate 66, the end 94 of the right lateral arm 14 and the second support plate 90 to secure those elements together. Likewise, the end 92 of the left lateral arm 12 is pivotally secured between the first support plate 66 and the second support plate 90 by left pivot bolt 116 (shown in phantom), which also extends between the perpendicular side 88 of the second angle bracket 72, the first support plate 66, the end 92 of the left lateral arm 12 and the second support plate 90 to secure those elements together. As shown in FIG. 5, the terminal ends of the lateral arms 12, 14 may be open, closed or have secured thereto a dust cap 118.

Referring again to FIG. 2, it can be seen that the right lateral arm 14 and left lateral arm 12 of the device 10 are pivotally secured to the lateral arm assembly 64 as previously described and extend rearward from the wheel assembly 16. The left lateral arm 12 is illustrated as being configured with a first segment 120 which is oriented at an angle to the plane of the wheel 28 and a second segment 122 which is oriented at an angle to the first segment 120, while extending parallel to the plane of the wheel 28. A left arm extension member 124 is shown secured to the lateral arm 12 by means of a bolt 126 or other suitable means, and the left arm extension member 124 is shown as being comprised of a first segment 128 which extends coaxially with the second segment 122 of the left lateral arm 12 and a second angled segment 130 which is oriented outwardly at an angle to the adjacent first segment 128. In similar fashion, the right lateral arm 14 is illustrated as being configured with a first segment 132 which is oriented at an angle to the plane of the wheel 28 and a second segment 134 which is oriented at an angle to the first segment 132, while extending parallel to the plane of the wheel 28. A right arm extension member 136 is shown secured to the right lateral arm 14 by means of a bolt 138 or other suitable means, and the right arm extension member 136 is shown as being comprised of a first segment 140 which extends coaxially with the second segment 132 of the right lateral arm 14 and a second angled segment 142 which is oriented outwardly at an angle to the adjacent first segment 140. The right arm extension member 136 and left arm extension member 124 are optionally used to provide additional leverage in engaging and moving the bale of hay. To that end, as shown in FIG. 1, the second segment 130, 142 of each respective arm extension member 124, 136 is angled slightly downward from a horizontal plane 146 defined by the lateral arms 12, 14 to assist in engaging and lifting the bale 62 for movement. However, the arm extension members 124, 136 are not strictly necessary to the operation of the device 10.

Both the right lateral arm 14 and the left lateral arm 12 have associated therewith a bale-engaging member 18, 20. As shown more clearly in FIGS. 1, 3 and 4, the bale-engaging member 18 of the left lateral arm 12 may comprise a rail 150 which is attached to the left lateral arm 12 by a bolt 152, or other suitable means. The rail 150 is positioned to extend downward from the left lateral arm 12. The rail 150 may preferably be made of structurally strong metal, such as steel, and may preferably be formed with a terminal spike 154, which is oriented inwardly toward the center line 156 (FIG. 2) of the device. Although the configuration of the rail 150 may be any suitable shape, size or dimension, the rail may, for example, be formed as a tubular length of metal which is bent at one end to form the terminal spike 154. The rail 150 may also be formed with a second spike 158 positioned above and away from the terminal spike 154 of rail 150, the second spike 158 also being oriented inwardly toward the center line 156 of the device 10. The second spike 158, for example, may be separately formed and welded to the rail 150. As described with respect to the left lateral arm 12, the right lateral arm 14 may also be structured with a downward extending rail 160 secured to the right lateral arm 14 by a bolt 162, or other suitable means, and which is formed with a terminal spike 164, oriented inwardly toward the center line 156 of the device 10. The rail 160 may also preferably have an inwardly-oriented second spike 166.

The right lateral arm 14 and left lateral arm 12 are, as previously described, pivotally connected to the lateral arm assembly 64 by pivot bolts 114 and 116, respectively. The right lateral arm 14 and left lateral arm 12 are also attached to the wheel assembly 16 by a linkage mechanism 168. For example, the left lateral arm 12 may be secured to the wheel assembly 16 by means of a left tie rod 170 while the right lateral arm 14 is secured to the wheel assembly 16 by means of a right tie rod 172. As shown more clearly in FIGS. 3, 4 and 5, the left tie rod 170 is secured at one end to a ball joint bracket 176 which, in turn, is bolted to the vertical support 40 by bolts means 178. The other end of left tie rod 170 is secured to the left lateral arm 12 by a ball joint member 180 which allows the left tie rod 170 to move relative to the left lateral arm 12. Similarly, the right tie rod 172 is secured at one end to the ball joint bracket 176 and is secured at its other end to the right lateral arm 14 by means of a ball joint member 182 which allows the right tie rod 172 to move relative to the right lateral arm 14. Both the left tie rod 170 and right tie rod 172 are secured to the ball joint bracket 176 with a ball joint bolt mechanism 186 (FIG. 1) which allows the two tie rods 170, 172 to move relative to the vertical support 40.

In operation, and referring to FIGS. 1 and 2, the user grasps the distal ends 190, 192, respectively, of the left lateral arm 12 and right lateral arm 14 and, while lifting the lateral arms 12, 14, urges the device 10 forward so that the wheel 28 rotates in the direction of arrow 194 (FIG. 1). The user positions the device 10 into proximity with a bale of hay 62 by moving the lateral arms 12, 14 apart from each other, in the direction of arrows 196 and 198, and by positioning the wheel 28 of the device 10 in front of the bale 62 while centering the center line 156 of the device 10 over the center line of the bale of hay. In moving the lateral arms 12, 14 apart, not only are the bale-engaging members 18, 20 of the lateral arms 12, 14 positioned away from the bale of hay, but the outward movement of the lateral arms 12, 14 imposes an axial force on the respective tie rods 170, 172 so that the vertical support 40 pivots about bolt 78, thereby forcing the wheel 28 and its associated bale-engaging member 22, or spike 60, to move in the direction of arrow 194, away from the bale of hay 62. When the user has the device 10 properly centered with respect to the bale of hay 62, the user then brings the lateral arms 12, 14 back together in the direction of the center line 156 of the device 10, which consequently causes the spikes 154, 158, 164, 166 associated with the respective lateral arms 12, 14 to pierce the bale of hay and thereby engage it on the spikes 154, 158, 164, 166. At the same time, the inward force of the lateral arms 12, 14 causes the tie rods 170, 172 to exert a force, in the direction of arrow 195, on the vertical support 40 which, in turn, causes the vertical support 40 to rotate about pivot bolt 78 to bring the wheel 28, and thus the spike 60 associated with the wheel 28, toward the bale of hay. The spike 60 is thus caused to pierce the face of the bale 62 as shown in FIG. 1. The user then lifts the lateral arms 12, 14 upward in the direction of arrow 200 (FIG. 1), which causes the bale to be lifted from the ground. The user then propels the device 10 forward, in the direction of arrow 194 to transport the bale of hay 62 to a desired location. The device 10 is disengaged from the bale of hay 62 by simply moving the lateral arms 12, 14 apart in the direction of arrows 196 and 198, which disengages the bale-engaging members 18, 20 from the sides of the bale 62 and which also causes the bale-engaging member 22, or spike 60, associated with the wheel 28 to disengage from the face of the bale 62. The device 10 can then be maneuvered and wheeled away from proximity with the bale of hay.

Figure 7:
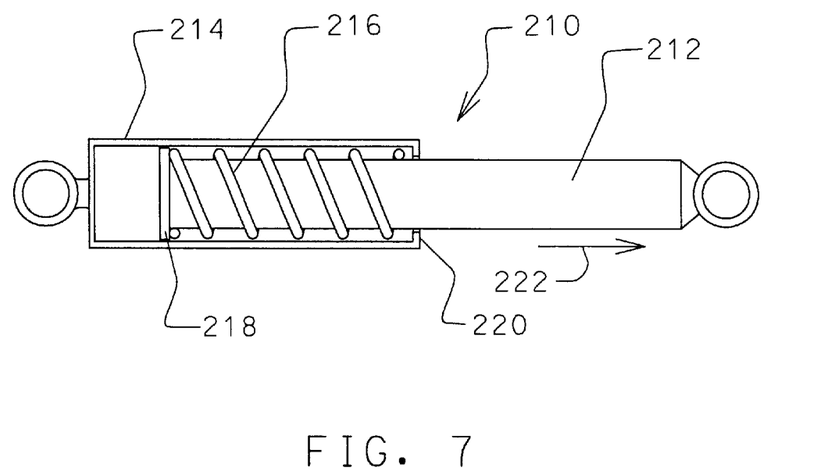
FIG. 7 is a view in elevation of an alternative linkage mechanism, which is in the form of a biased spring mechanism.

While the linkage mechanism 168 has been illustrated and described herein as a pair of tie rods 170, 172, which may be a particularly suitable embodiment of the present invention, alternatively, the linkage mechanism 168 may be a pair of spring-biased members 210, a representative one of which is shown in FIG. 7. The spring-biased members 210 would replace the tie rods 170, 172 as shown in FIGS. 1–5. The spring-biased member 210 shown in FIG. 7 is a very simple example of a device that may be used in the present invention. It comprises a rod 212 slidable within a cylindrical housing 214. A spring 216 surrounds one end of the rod 212 and is biased between an end flange 218 of the rod 212 and the end wall 220 of the housing 214. When the lateral arms 12, 14 of the invention are forced apart in the direction of arrows 196 and 198 (FIG. 2), the rod 214 is slidably moved, in the direction of arrow 222 from the housing 214, thereby causing the spring 216 to compress. When outward force on the lateral arms 12, 14 stops, the spring 216 expands again causing the lateral arms 12, 14 to be brought back together in the direction of the center line 156 of the device, thereby automatically engaging the spikes 154, 158, 164, 166 with the bale. When constructed with spring-biased members, the lateral arm assembly 62 may be pivotally connected to the vertical support 40 as previously described or may be stationarily secured to the vertical support 40.

Other equally suitable devices or mechanisms may be used as linkage mechanisms 168, including pneumatic or hydraulic devices, or the like.

The bale-lifting and transporting device of the present invention is particularly constructed to enable a person of modest strength to lift and move bales of plant material, such as hay, without having to physically lift the bale onto the device for movement, as is known in prior devices. The construction and configuration of the device of the present invention also makes lifting and transporting a bale of plant material considerably easier than other known methods. The present invention can be adapted to move any number of objects other than bales of plant material. Thus, it would be apparent to one of skill in the art that such adaptions can be made and reference herein to details of the illustrated embodiments is made by way of example and are not meant to limit the scope of the invention, as defined by the claims.

What is claimed is:

1. A hand-operated lifting and transporting device, comprising:
   a wheel assembly having a wheel;
   a right lateral arm pivotally secured to said wheel assembly to provide articulation between said right lateral arm and said wheel assembly;
   a left lateral arm pivotally secured to said wheel assembly to provide articulation between said left lateral arm and said wheel assembly such that said left lateral arm is selectively positionable in spaced lateral arrangement with respect to said right lateral arm;
   a bale-engaging member secured to said wheel assembly oriented to engage a bale of plant material; and
   bale-engaging members attached to each respective right lateral arm and left lateral arm, each bale-engaging member being oriented to engage a bale of plant material.

2. The hand-operated device of claim 1 wherein said bale-engaging member secured to said wheel assembly is oriented rearward of said wheel.

3. The hand-operated device of claim 2 wherein said bale-engaging member of said wheel assembly is at least one spike.

4. The hand-operated device of claim 1 wherein said right lateral arm and said left lateral arm extend rearward from said wheel assembly and are substantially parallel to each other.

5. The hand-operated device of claim 4 wherein said bale-engaging member secured to said left lateral arm is oriented toward said right lateral arm and wherein said bale-engaging member secured to said right lateral arm is oriented toward said left lateral arm.

6. The hand-operated device of claim 5 wherein said bale-engaging member of said left lateral arm is at least one spike and wherein said bale-engaging member of said right lateral arm is at least one spike.

7. The hand-operated device of claim 1 further comprising a linkage mechanism connecting said left lateral arm to said wheel assembly and further comprising a linkage mechanism connecting said right lateral arm to said wheel assembly.

8. The hand-operated device of claim 7 wherein said linkage mechanism of said left lateral arm and said linkage mechanism of said right lateral arm are each tie rods.

9. The hand-operated device of claim 7 wherein said linkage mechanism of said left lateral arm and said linkage mechanism of said left lateral arm are each spring-loaded members.

10. A hand-operated bale lifting and transporting device, comprising:
    a wheel assembly having a wheel;
    a lateral arm assembly connected to said wheel assembly;
    a right lateral arm pivotally connected to said lateral arm assembly;
    a left lateral arm pivotally connected to said lateral arm assembly;
    a bale-engaging member connected to said wheel assembly;
    a bale-engaging member connected to said right lateral arm, said bale-engaging member of said right lateral arm being oriented toward said left lateral arm; and
    a bale-engaging member connected to said left lateral arm, said bale-engaging member of said left lateral arm being oriented toward said right lateral arm.

11. The hand-operated bale lifting and transporting device of claim 10 further comprising a right lateral arm extension connected to said right lateral arm and further comprising a left lateral arm extension connected to said left lateral arm.

12. The hand-operated bale lifting and transporting device of claim 10 wherein said bale-engaging member connected to said wheel assembly is oriented rearward of said wheel assembly.

13. The hand-operated bale lifting and transporting device of claim 12 wherein said bale-engaging member connected to said right lateral arm is at least one spike and wherein said bale-engaging member connected to said left lateral arm is at least one spike.

14. The hand-operated bale lifting and transporting device of claim 10 further comprising a linkage mechanism interconnecting said right lateral arm to said lateral arm assembly and further comprising a linkage mechanism interconnecting said left lateral arm to said lateral arm assembly.

15. The hand-operated bale lifting and transporting device of claim 14 wherein said linkage mechanism of said right lateral arm is a spring-biased member and wherein said linkage mechanism of said left lateral arm is a spring-biased member.

16. The hand-operated bale lifting and transporting device of claim 14 wherein said linkage mechanism of said right lateral arm is a tie rod and wherein said linkage mechanism of said left lateral arm is a tie rod.

17. The hand-operated bale lifting and transporting device of claim 16 wherein said wheel assembly is pivotally connected to said lateral arm assembly to articulate relative thereto.

* * * * *